May 26, 1959 C. D. LINDRIDGE 2,888,517
SYSTEM AND APPARATUS FOR REPRODUCING AND RE-RECORDING MUSIC
Filed Nov. 2, 1953 3 Sheets-Sheet 1
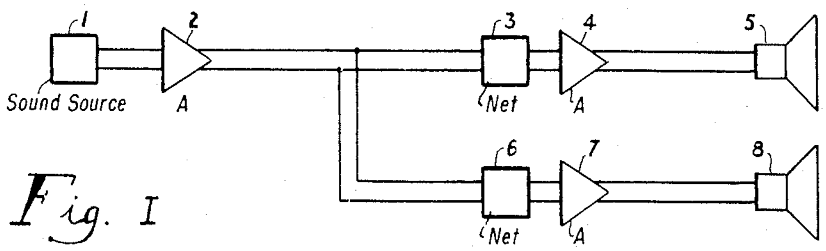
Fig. I
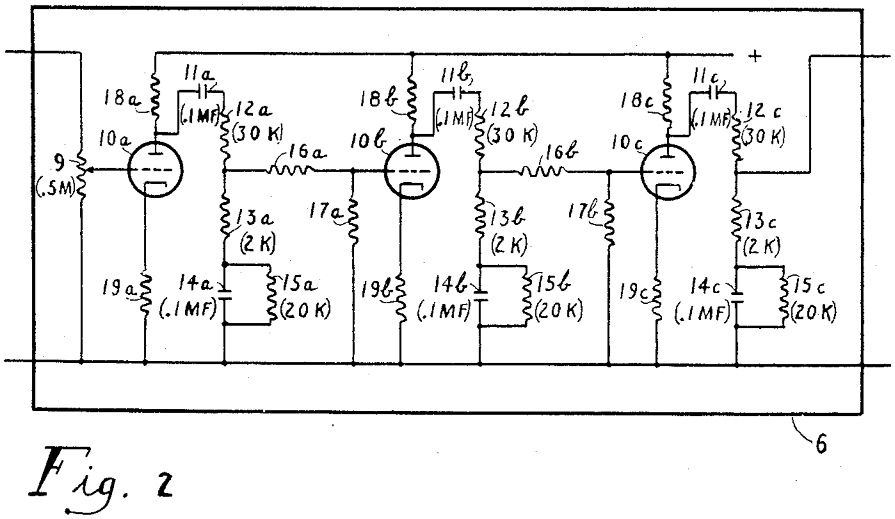
Fig. 2
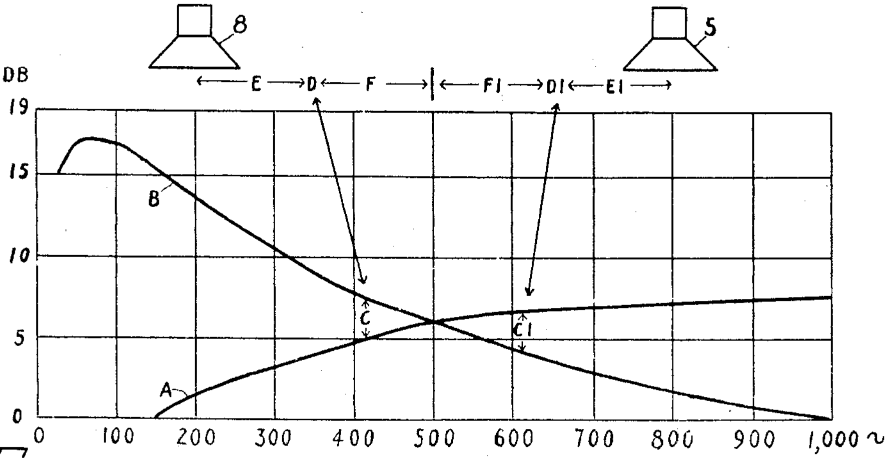
Fig. 3
INVENTOR.
Charles D. Lindridge
BY
Leo C. Krazinski
attorney May 26, 1959 C. D. LINDRIDGE 2,888,517

SYSTEM AND APPARATUS FOR REPRODUCING AND RE-RECORDING MUSIC

Filed Nov. 2, 1953 3 Sheets-Sheet 2

INVENTOR.
Charles D. Lindridge
BY Leo C. Krazinski
Attorney

May 26, 1959 C. D. LINDRIDGE 2,888,517

SYSTEM AND APPARATUS FOR REPRODUCING AND RE-RECORDING MUSIC

Filed Nov. 2, 1953 3 Sheets-Sheet 3

INVENTOR.
Charles D. Lindridge
BY Leo C. Krazinski
Attorney 2,888,517

SYSTEM AND APPARATUS FOR REPRODUCING AND RE-RECORDING MUSIC

Charles D. Lindridge, Montclair, N.J., assignor of one-fourth to Leo C. Krazinski, New York, N.Y.

Application November 2, 1953, Serial No. 389,539

7 Claims. (Cl. 179—1)

This invention relates to sound reproduction, particularly to a system and apparatus for reproducing and rerecording music.

An object of this invention is to provide an improved arrangement for multi-directional sound from a single source of sound.

Another object of this invention is to provide improved reproduction of the sound of deep bass musical instruments.

Other objects will appear from the following description reference being made to the following drawings in which:

Fig. 1 is a schematic of a music reproducing system.

Fig. 2 is a schematic circuit of a bass emphasis and treble alternation network of Fig. 1.

Fig 3 is a graph showing a frequency characteristic obtained with the use of Fig. 1.

Figure 4:
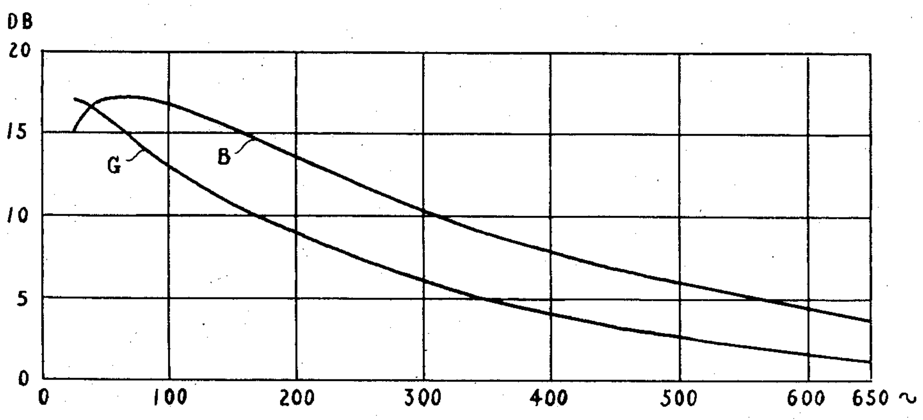
Fig. 4 is a graph showing a portion of a bass frequency characteristic of Fig. 3, and a portion of a bass frequency characteristic of treble and bass emphasis and attenuation networks ordinarily used with audio amplifiers.

In Fig. 1 audio frequencies are produced at 1 which may be a sound head associated with a motion picture film having a single sound track, or a pickup associated with a disc phonograph record, or a reproducing head associated with magnetic tape, or an FM or AM radio receiver, or any other source of audio frequency current. 1 is shown connected to the input of preamplifier 2. The output of preamplifier 2 is shown connected to the input of treble and emphasis and attenuation network 3, which may be of the type customarily used at the input of audio amplifiers, but is preferably one providing for high frequency emphasis and low frequency attenuation and not for high frequency attenuation and low frequency emphasis. The output of treble and bass emphasis and attenuation network 3 is shown connected to the input of amplifier 4. The output of amplifier 4 is shown connected to speaker 5. The output of preamplifier 2 is also shown connected to the input of bass emphasis and treble attenuation network 6. The output of bass emphasis and treble attenuation network 6 is shown connected to the input of amplifier 7. The output of amplifier 7 is shown connected to speaker 8.

In Fig. 2 the bass emphasis and treble attenuation network 6 of Fig. 1 is shown. This provides for low frequency emphasis and high frequency attenuation.

Potentiometer 9 has a resistance of one-half megohm and is shown connected to vacuum tube 10*a*. Capacitor 11*a* is .1 mf. and is shown connected to resistor 12*a*. Resistor 12*a* is 30,000 ohms and is shown connected to resistor 13*a*. Resistor 13*a* is 2,000 ohms and is shown connected to capacitor 14*a* and to resistor 15*a*. Capacitor 14*a* is .1 mf. and resistor 15*a* is 20,000 ohms. Resistors 16*a* and 17*a* total one-half megohm and their values are so proportioned that the grid of vacuum tube 10*b* is at the desired level relative to transmission at 1,000 cycles. The values of resistors 18*a* and 19*a* are determined by the plate voltage and the characteristic of vacuum tube 10*a*.

Capacitors 11*b*, 11*c*, 14*b* and 14*c* are of the same capacity as capacitors 11*a* and 14*a*. Resistors 12*b* and 12*c* are of the same resistance as resistor 12*a*. Resistors 13*b* and 13*c* are of the same resistance as resistor 13*a*. Resistors 15*b* and 15*c* are of the same resistance as resistor 15*a*. Resistors 16*b* and 17*b* are so proportioned that the grid of vacuum tube 10*c* is at the desired level relative to the level at 1,000 cycles. The values of resistors 18*b*, 18*c*, 19*b* and 19*c* are determined by the plate voltage and the characteristic of vacuum tubes 10*b* and 10*c*.

In Fig. 3 curve A shows the characteristic obtained with the use of treble and bass emphasis and attenuation network 3 and speaker 5 of Fig. 1 when a customary treble and bass emphasis and attenuation network is used at 3 and when it is adjusted for maximum attenuation of the low frequencies. Curve B shows the characteristic obtained with the use of bass emphasis and treble attenuation network 6 and speaker 8. C and C1 show locations in the characteristics at which there is equivalent difference in level between the reproductions from speakers 5 and 8. The directions from which sound is heard relative to the C and C1 locations are indicated at D and D1, respectively. Distances E and E1 are equal. Distances F and F1 are equal.

In Fig. 4 the bass portion of characteristic B of Fig. 3 is shown with the bass portion of characteristic G which is obtained when a customary treble and bass emphasis and attenuation network is used at 6 in place of the bass emphasis and treble attenuation network shown in Fig. 2 and when adjustment is made for maximum bass emphasis.

Figures 5, 6:
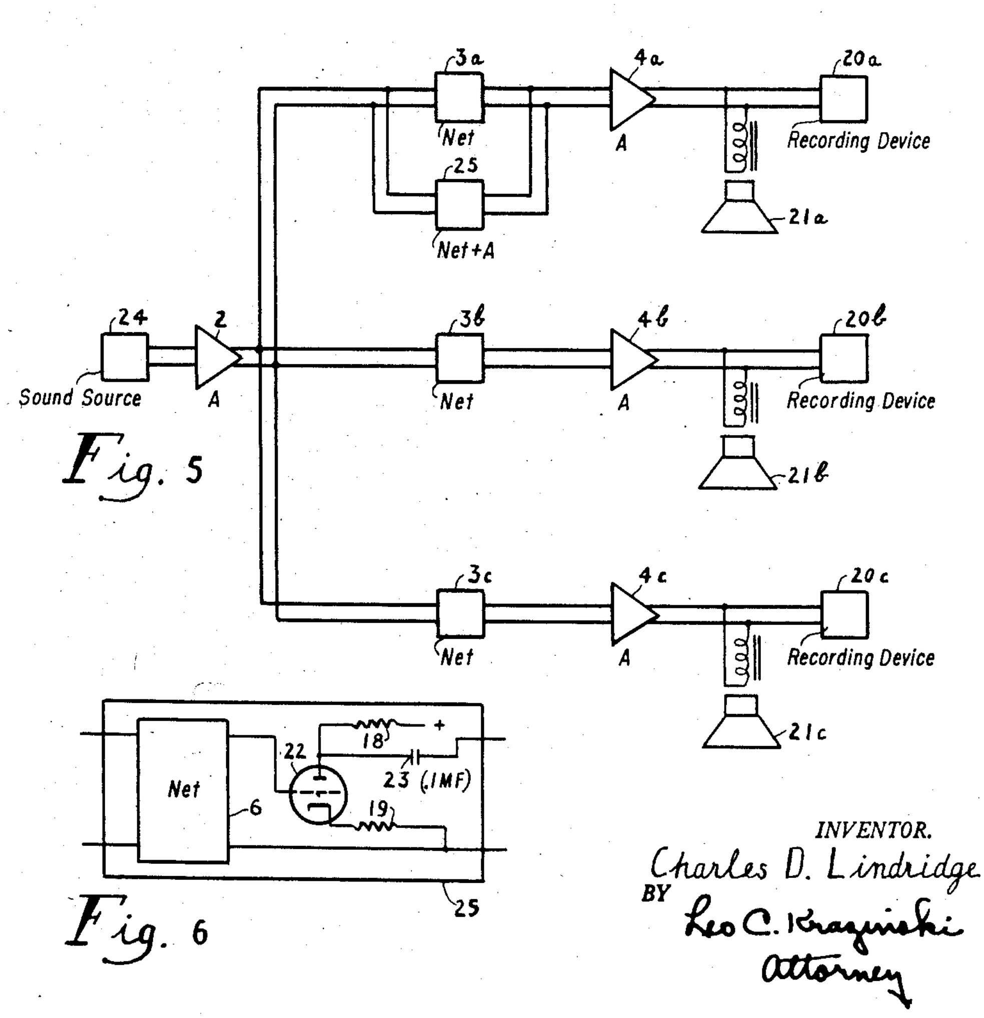
Fig. 5 is a schematic of a rerecording system for rerecording on to motion picture film having three sound tracks, music which has been recorded on motion picture film having a single sound track.
Fig. 6 is a schematic circuit of a bass emphasis and treble attenuation network and amplifier of Fig. 5.

In Fig. 5 audio frequencies are produced at sound source 24 which may be a sound head associated with a motion picture film having a single sound track or a magnetic reproducing head associated with magnetic tape on which there is a record of sound on a single track suitable for rerecording on to a motion picture film having a single sound track. 24 is shown connected to the input of preamplifier 2. The output of preamplifier 2 is shown connected to the inputs of treble emphasis and bass attenuation networks 3*a*, 3*b*, 3*c* and bass emphasis and treble attenuation network and amplifier 25. The output of treble emphasis and bass attenuation network 3*a* is shown connected to the input of amplifier 4*a* and bass emphasis and treble attenuation network 25 is shown connected in multiple with treble emphasis and bass attenuation network 3*a*. The output of amplifier 4*a* is shown connected to recording device 20*a* which may be a light valve or a magnetic recording head associated with one track of a motion picture film having three sound tracks, or with a magnetic recording head associated with one track of a multi-track magnetic tape for subsequent rerecording on to one track of a motion picture film having three sound tracks. The output of amplifier 4*a* is also shown connected to monitoring speaker 21*a*. The output of treble emphasis and bass attenuation network 3*b* is shown connected to the input of amplifier 4*b*. The output of amplifier 4*b* is shown connected to recording device 20*b* and to monitoring speaker 21*b*. The output of treble emphasis and bass attenuation network 3*c* is shown connected to the input of amplifier 4*c*. The output of amplifier 4*c* is shown connected to recording device 20*c* and monitoring speaker 21*c*.

In Fig 6 bass emphasis and treble attenuation network and amplifier 25 of Fig. 5 is shown in detail. The output of bass emphasis and treble attenuation network 6 of Fig. 1 is shown connected to a separation amplifier to prevent bass emphasis and treble attenuation network 6 from affecting high frequencies which pass through treble emphasis and bass attenuation network 3*a*. Bass emphasis and treble attenuation network 6 is connected to vacuum tube 22. Capacitor 23 is of .1 mf. and functions only as a blocking capacitor. The values of resistors 18 and 19 are determined by the characteristic of vacuum tube 22.

Figure 7:
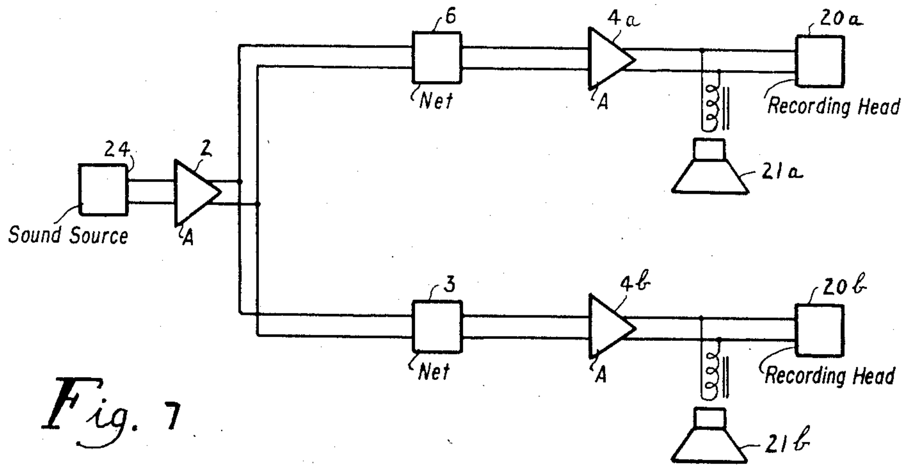
Fig. 7 is a schematic of a rerecording system for recording on to two track magnetic tape, music which has been recorded on single track magnetic tape.

In Fig. 7 audio frequencies are produced at sound source 24 which may be a magnetic reproducing head associated with single sound track magnetic tape. 24 is shown connected to the input of preamplifier 2. The output of preamplifier 2 is shown connected to the input of bass emphasis and treble attenuation network 6. The output of bass emphasis and treble attenuation network 6 is shown connected to the input of amplifier 4*a*. The output of amplifier 4*a* is shown connected to magnetic recording head 20*a* and to monitoring speaker 21*a*. The output of preamplifier 2 is also shown connected to the input of treble emphasis and bass attenuation network 3. The output of treble emphasis and bass attenuation network 3 is shown connected to the input of amplifier 4*b*. The output of amplifier 4*b* is shown connected to magnetic recording head 20*b* and to monitoring speaker 21*b*. Magnetic recording heads 20*a* and 20*b* are associated with a magnetic tape having two sound tracks.

Figure 8:
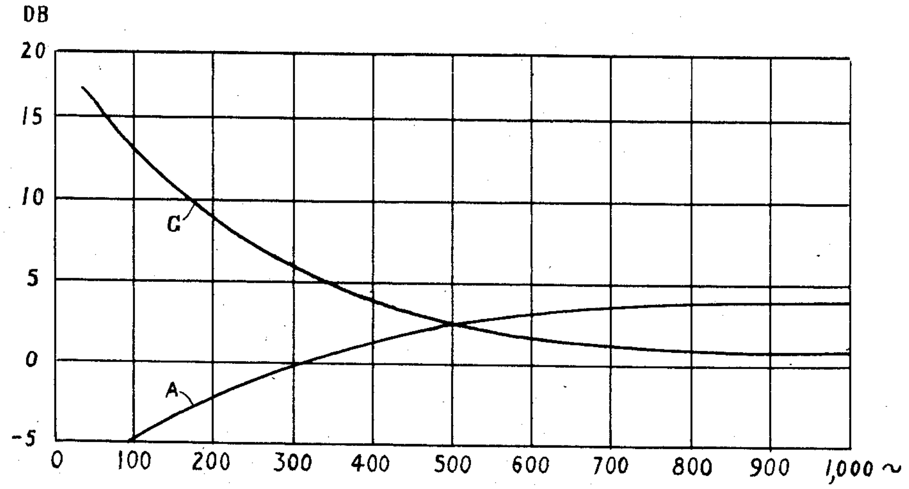
Fig. 8 is a graph showing a frequency characteristic of Fig. 3 and a frequency characteristic of Fig. 4.

In Fig. 8 characteristic A of Fig. 3 and characteristic G of Fig. 4 are shown with the cross-over at 500 cycles. These curves are shown in the customary manner relative to the db scale, the customary manner being to show the db scale on the basis of no bass or treble emphasis or attenuation. However, when a customary bass network is adjusted for maximum emphasis or attenuation the level at 1,000 cycles changes approximately 1 db in the direction of the emphasis or attenuation. Consequently the difference in level of the two networks at 1,000 cycles is only approximately 3 db whereas it would be 5 db if they were adjusted for no emphasis or attenuation.

In Fig. 1 speakers 5 and 8 are spaced a distance apart, from side to side, the distance depending upon the size of the room, or auditorium, in which the speakers are used. Speakers 5 and 8 may be of a dynamic type or horn type and are preferably mounted in enclosures equipped with vanes for stereophonic reproduction. Speaker 5 reproduces sound with emphasis of high frequencies and speaker 8 reproduces sound with emphasis of low frequencies.

Bass emphasis and treble attenuation network 6 of Figs. 1 and 2 differ from customary bass emphasis and treble attenuation networks primarily in that frequencies in the order of 500 cycles are emphasized appreciably more than is possible with customary bass emphasis and treble attenuation networks. A requirement of customary bass emphasis and treble attenuation networks is that they must have no appreciable effect upon the high frequencies. For this reason the emphasis at 500 cycles is limited to approximately 1.5 db. Referring to Fig. 8, characteristic G shows an emphasis of 2.5 db. at 500 cycles when reference is made to the db scale, but only 1.5 db when reference is made to characteristic G at 1,000 cycles. Bass emphasis and treble attenuation network 6 provides emphasis of 6 db at 500 cycles and an attenuation, not shown on the drawings, of approximately 10.5 db at 10,000 cycles.

Bass emphasis and treble attenuation network 6 differs from customary bass emphasis and treble attenuation networks, furthermore, in that it provides a falling off characteristic in the 50–100 cycle region whereas in customary bass emphasis and treble attenuation networks there is a sharp increase in emphasis with decrease in frequency in this region. Although it differs also in that it does not make use of feedback this is not a necessary difference as a circuit without feedback is shown mainly for the reason that a circuit meeting the requirements of bass emphasis and treble attenuation network 6 in Fig. 1 can be more clearly shown than one which is on a feedback basis, and partly for the reason that feedback for such a circuit is of very much less importance that it is for a circuit which is required to carry the high frequencies.

In Fig. 3 characteristics A and B cross over at 500 cycles. A cross-over, however, at this or any other frequency can exist only relative to a listener, as the frequency at which it takes place varies with the location, from side to side, of the listener. For a listener who is equidistant from speakers 5 and 8 the cross-over is at 500 cycles, assuming that the center of the space between speakers 5 and 8 coincides with the center of a room, near a wall, and that the sound absorption on both sides of the room is the same. If a listener moves nearer speaker 8 than speaker 5 characteristic B goes up in level and characteristic A goes down in level so that cross-over is at a higher frequency. If he moves nearer speaker 5 than speaker 8 characteristic A goes up in level and characteristic B goes down in level so that the cross-over is at a lower frequency.

When two speakers are used as shown in Figs. 1 and 3, low fundamental frequencies do not determine the directions from which sounds of musical instruments and voices reach a listener. The directions are determined by the partials of the sounds in which there is most energy. The sound of the bassoon can be considered as representing conditions which exist in greater or lesser degree with all musical instruments and with voices. The dominant resonance region, that is, the region in which there is most energy in the partials, of the bassoon, remains between 370 and 587 cycles, this being within four semitones of the note B flat, which has a frequency of 466 cycles, when the fundamental frequency is varied over a range of thirty-two semitones, which is nearly three octaves. To a listener equidistant from speakers 5 and 8 in Fig. 3 the sound of the bassoon is heard from directions between the speakers and never from the direction of either speaker regardless of the fundamental frequency.

Fundamental frequencies sound so prominent that customary bass emphasis circuits have been designed on the basis that they should be emphasized in order to emphasize the sound of the deep bass instruments. The customary practice of showing audio frequency characteristics on a logarithmic frequency basis gives weight to this idea as a large space is allotted to the 0–100 cycle range. Except for notes in the 32 foot octave and the bottom three or four notes of the sixteen foot octave of the organ, which notes are very seldom recorded, the level of the frequencies in this range is relatively unimportant providing that they are not raised in level too much. If the response of the associated speaker falls off rapidly below 100 cycles there is no objection to emphasis at these frequencies. But if the response of the speaker is relatively good down to 25 cycles, considerable emphasis at these frequencies, relative to the level in the 150–300 cycle range, can result in a booming effect without raising the sound of the deep bass instruments.

The reason why low fundamental frequencies sound so prominent although they usually have very little energy, has been explained by Carl E. Seashore in "Psychology of Music," page 186, in which he referred to the note E in the 16 foot octave, frequency 82 cycles, played on the bassoon, as follows: "in hearing, the fundamental is reinforced by a series of subjective tones generated by the other partials. Thus the difference between the first and second partials is 82 cycles, the difference between the second and third partials is the same, and so on. Each of these generates a difference tone, always the same pitch as the fundamental, so that the strength of the fundamental becomes cumulative. That is what makes the fundamental stand out so clearly in hearing."

Multi-directional sound has previously been obtained by using a circuit as shown in Fig. 1 and a customary treble and bass emphasis and attenuation network at 3 providing high frequency emphasis and low frequency attenuation and a customary treble and bass emphasis and attenuation network at 6 providing low frequency emphasis and high frequency attenuation. A customary treble and base emphasis and attenuation network is considered as one which maintains a level at 1,000 cycles which does not vary more than approximately 1 db when the bass is emphasized or attenuated or more than approximately 1 db when the high frequencies are emphasized or attenuated. It is also considered as one which provides for either high frequency emphasis or high frequency attenuation and also for either low frequency emphasis or low frequency attenuation. With the use of two such networks in Fig. 1 at 3 and 6, the cross-over must be at approximately 1,000 cycles in order to be at the same frequency, or approximately the same frequency, with reference to listeners who are equidistant from speakers 5 and 8 and other listeners who are nearer one speaker than the other. The reason for this is that the cross-over cannot be made at any other frequency at which the characteristics are not substantially parallel to each other on the high frequency side of the cross-over as shown in Fig. 8. When the characteristics are substantially parallel on either side of the cross-over a listener has but to move slightly in one direction away from a point equidistant from the speakers to have the cross-over at a substantially different frequency. In order to use customary treble and bass emphasis and attenuation networks at 3 and 6 and to have the cross-over at 500 cycles the difference in level at 1,000 cycles of the two networks can be no more than approximately 3 db. A listener has therefore to move only so far in the direction of speaker 8 and away from speaker 5 to hear the sound from speaker 8 3 db higher than the sound from speaker 5 in order to hear the cross-over at 1,000 cycles. The sound from speaker 8 is not required to be 3 db higher than when the listener was equidistant from both speakers. The level of sound from speaker 5 goes down as he moves away from it and the difference between the two levels of sound is required to be only 3 db.

There is a very substantial difference in the effect upon reproduced music in having the cross-over at 500 and at 1,000 cycles. At 500 cycles there is no effect of sounds of instruments jumping from one speaker to the other. At 1,000 cycles, even when a listener is equidistant from both speakers, all notes played on the E string and many notes played on the A string of the violin are heard coming from the high frequency speaker. Low notes of the violin are heard coming from the low frequency speaker. 88 percent of the energy is in the lowest five partials of G, 196 cycles, of the violin, as shown in "Psychology of Music," page 98. These five partials are lower than 1,000 cycles. There is a similar effect upon the sound of many other instruments and of voices. Furthermore, there is no effect of the sound of some instruments, such as the bassoon, coming consistently from the space between the two speakers. With a cross-over at 1,000 cycles certain records of music can be selected from a large number with which the sound of instruments jumping from one speaker to the other is not noticeable to a non-critical listener. But it is noticable with other records.

The principal feature of this invention is the use of, and the provision of means for producing widely divulging portions of the characteristics on each side of the cross-over frequency, particularly on the high frequency side, as shown in Fig. 3, compared to Fig. 8. This tends to stabilize a cross-over frequency as a listener moves away from a point equidistant from both speakers. The cross-over is preferably at approximately 500 cycles but may be as low as 350 cycles without noticeable effect of the sound of bass instruments jumping to the high frequency speaker, but not much emphasis can be applied with the use of this low cross-over frequency. It may also be higher than 500 cycles when it is desired that a soprano vocalist be heard from the high frequency speaker and a tenor or bass vocalist be heard from the low frequency speaker.

When there is maximum bass emphasis in customary treble and bass emphasis and attenuation networks the level at 1,000 cycles is approximately 1 db higher than it is when there is no bass emphasis. When there is maximum bass attenuation the level at 1,000 cycles is approximately 1 db. lower than it is when there is no bass attenuation. However, the db scale is usually shown on the basis of no emphasis or attenuation and characteristic A in Fig. 3 and characteristics A and G in Fig. 8 are shown on this basis. As characteristic A in Fig. 3 shows the maximum bass attenuation obtainable with a customary treble and bass emphasis and attenuation network the difference in level between characteristics A and B at 1,000 cycles is approximately 7.5 db. It is evident that if in place of a customry treble and bass emphasis and attenuation network at 3 in Fig. 1 a network is used providing only high frequency emphasis and low frequency attenuation, in place of one providing either emphasis or attenuation of the high frequencies and also either emphasis or attenuation of the low frequencies, a greater difference in level can be provided between the two characteristics at 1,000 cycles.

The maximum bass emphasis obtainable with the use of a customary treble and bass emphasis and attenuation network may be shown as 16 db but this is relative to a frequency in the order of 10,000 cycles. Relative to a frequency of 1,000 cycles it is 15 db. And the 15 db emphasis applies to the very low frequencies and not to the frequencies which determine the tone or characteristic sound of the deep bass instruments. The frequencies which determine the tone of the deep bass instruments are raised in level approximately 8 db. This emphasis is slightly more than that provided by characteristic B of Fig. 3 for which much more amplification was required.

Appreciable high frequency emphasis at network 3 in Fig. 1, assuming it to be a customary treble and bass emphasis and attenuation network, may result in some increase in level of characteristic A in Fig. 8 in the 700–1,000 cycle range. However, any such increase in level would apply also to characteristic A in Fig. 3.

In this invention a much higher level of energy is used in the mid range of frequencies between 0 and 1,000 cycles than can be provided with customary treble and bass emphasis and attenuation networks and it is used in such manner that the level of sound from the associated speaker, relative to the level of sound of the high frequencies at the high frequency speaker is not higher than it would be if a customary treble and bass emphasis and attenuation network was used. If it was correspondingly higher no invention might be involved. This is done by the use of a level at 1,000 cycles at the treble and bass emphasis and attenuation network associated with the high frequency speaker which is appreciably more than 3 db above the level at 1,000 cycles at the bass emphasis and treble attenuation network associated with the low frequency speaker. If a customary network is used at 6 in Fig. 1 and the difference in level at 1,000 cycles is more than approximately 3 db between the two networks 3 and 6 there can be no cross-over in the mid range of frequencies between 0 and 1,000 cycles relative to a listener equidistant from both speakers.

In customary sound reproducing equipment the level of the deep bass is raised by progressively increasing the level as the frequency decreases as in characteristic G of Fig. 4. This would be an effective procedure if a large proportion of the energy was in the fundamental frequencies of low notes and if fundamental frequencies contributed to the characteristic sound of the instruments. There is usually very little energy in the fundamental frequencies of low notes, but occasionally the energy is appreciable. For example, when E flat or B flat, frequencies 39 and 58 cycles, respectively, is played on the bass tuba, not more than three percent of the total energy is in the fundamental. But when the intermediate note G, frequency 49 cycles is played, 40 percent of the energy is in the fundamental, due, apparently, to a resonance of the instrument at this frequency. This great difference in the amount of energy in the fundamental is not ordinarily noticeable due to the lack of sensitivity of the ear at such very low frequencies. But if this 40 percent of energy is raised in level 9 db above the remaining energy, more than 80 percent of which, for note G is between 196 and 392 cycles, the booming effect is heard unless the response of the speaker falls off rapidly below 100 cycles. Many resonances which without having tests made have been assumed to be in the speaker have probably been in the musical instrument the sound of which has been recorded.

Not only is there usually very little energy in the fundamental frequency of low notes, but the octave above, the second partial, in which there is usually appreciable energy does not contribute to the characteristic sound of the instrument. Referring to "Science and Music," by Sir James Jeans, page 86, "The second harmonic adds clearness and brilliance but nothing else, it being a general principle that the addition of the octave can introduce no difference of timbre or characteristic musical quality." As the lowest octave of the double bass and of the bass tuba are from approximately 41 to 82 cycles the advantage of emphasizing any frequency below the third partial of 41 cycles, which is 123 cycles, in order to obtain better reproduction of the very low notes which are very seldom played by instruments which are very seldom used for recording, seems to be heavily outweighed by the disadvantage of producing a booming effect due to emphasis of very low notes at which instruments which are frequently used resonate. A special network can then be used when it is desired to obtain emphasis of the 32 foot notes played on an organ. Emphasis of frequencies below 100 cycles cannot be justified by the inefficiency of the ear at these frequencies as this was allowed for at the time that the music was recorded, the recording engineer having made adjustments to obtain satisfactory balance between the treble and the bass and not to obtain a flat characteristic.

In the operation of Fig. 5 recording device **20*b* is used when a vocalist is required to be shown near the center of a screen at the time that the film, or a copy thereof, is subsequently projected on to a motion picture screen. Recording device 20*c* is used when the vocalist is required to be shown near one end of the screen, which may be considered to be the right end. Recording device 20*a* is used at all times for rerecording of the bass portion of the accompaniment and is also used for rerecording the melody sung by the vocalist, and also, of course, the treble portion of the accompaniment when the vocalist is required to be shown at this end of the screen. When the vocalist is required to be shown at this end of the screen no effect is provided of multi-directional sound. The sound of the voice of a deep bass vocalist can be separated from the sound of deep bass instruments of the orchestra by slightly increasing still further the difference in level at 1,000 cycles between bass emphasis and treble attenuation network and amplifier 25 and treble and bass emphasis and attenuation networks 3*b* or 3*c* thus producing the cross-over at a frequency in the order of 400 cycles. If the location of the vocalist as shown on the screen is mainly near the center of the screen and toward the right end during a musical selection, recording device 20*a* is associated with the sound track for the speaker at the left of the screen. If mainly near the center of the screen and toward the left recording device 20*a* is associated with the sound track for the speaker at the right of the screen. Recording devices 20*a* and 20*c*** cannot, of course, be interchanged during a musical selection, but otherwise they can be interchanged as required during a musical production.

Fig. 7 shows an arrangement for rerecording on to a magnetic tape having two sound tracks, such as used for binaural reproduction, music which has previously been recorded on a monaural record. It is evident that it can also be used to produce a multi-directional sound record on disc record having two bands of grooves by using cutting heads as the recording devices **20*a* and 20*b* and a pickup associated with a monaural disc record for the sound source 24**.

Various changes may be made in the system and apparatus described in this specification without departing from the underlying principle of the invention. For examples, any suitable types of vacuum tubes may be used in place of the triodes shown in Figs. 2 and 6, and a filter, or filters of a different design may be used. I therefore desire, by the following claims, to include within the scope of my invention, all such modifications and variations by which substantially the result of my invention may be obtained by the use of substantially the same or equivalent system and apparatus.

I claim:

1. A system for reproducing music from a single sound source which includes apparatus for emphasizing treble frequencies at a treble loudspeaker and for emphasizing bass frequencies at a bass loudspeaker, said apparatus for emphasizing bass frequencies including a plurality of vacuum tubes, a network at the output of each of said vacuum tubes, a condenser between each of said vacuum tubes and its associated network, said condenser preventing passage of direct current through said network and having a reactance at 200 cycles per second which is less than the reactance of said network and at 30 cycles per second having a reactance which is greater than the reactance of said network.

2. A system for reproducing music in accordance with claim 1, wherein said apparatus for emphasizing base frequencies emphasizes currents at 500 cycles per second at least 5 db more than it emphasizes currents at 1000 cycles per second.

3. A system for reproducing music in accordance with claim 1, wherein a level of current at the output of said bass emphasis circuit is such that the level of sound from said bass loudspeaker is the same as the level of sound from said treble loudspeaker at 500 cycles per second and at 1000 cycles per second is at least 6 db lower than the level of sound from said treble loudspeaker, said levels of sound being at all points equidistant from said loudspeakers.

4. A system for rerecording music from a single sound source which includes apparatus for emphasizing treble frequencies at a treble magnetic recording head which is associated with one sound track on magnetic tape, and for emphasizing bass frequencies at a bass magnetic recording head which is associated with another sound track on said magnetic tape, said apparatus for emphasizing bass frequencies including a plurality of vacuum tubes, a network at the output of said vacuum tubes, a condenser between each of said vacuum tubes and its associated network, said condenser preventing passage of direct current through said network and having a reactance at 200 cycles per second which is less than the reactance of said network and at 30 cycles per second having a reactance which is greater than the reactance of said network.

5. A system for rerecording music in accordance with claim 4, wherein said apparatus for emphasizing bass frequencies emphasizes currents at 500 cycles per second at least 5 db more than it emphasizes currents at 1000 cycles per second.

6. A system for rerecording music in accordance with claim 4, wherein a level of current at the output of said bass emphasis circuit is such that the level of current at said bass magnetic recording head is the same as the level of current at said treble magnetic recording head at 500 cycles per second and at 1000 cycles per second is at least 6 db lower than the level of current at said treble magnetic recording head.

7. A system for rerecording music from a single sound source on to three channels of a magnetic tape, successively, including apparatus for rerecording said music on any one of said channels, for rerecording bass frequencies of said music on one of said channels, and for emphasizing said bass frequencies, said apparatus for emphasizing base frequencies including a plurality of vacuum tubes, a network at the output of each of said vacuum tubes, a condenser between each of said vacuum tubes and its associated network, said condenser preventing passage of direct current through said network and having a reactance at 200 cycles per second which is less than the reactance of said network and at 30 cycles per second having a reactance which is more than the reactance of said network, and said apparatus for emphasizing bass frequencies emphasizing currents at 500 cycles per second at least 5 db more than it emphasizes currents at 1000 cycles per second.

References Cited in the file of this patent

UNITED STATES PATENTS

| | | |
|---|---|---|
| 1,674,683 | Hahnemann | June 26, 1928 |
| 2,179,840 | Bucky | Nov. 14, 1939 |
| 2,474,191 | Reid et al. | June 21, 1949 |
| 2,499,603 | Mueller | Mar. 7, 1950 |